US007012413B1

(12) United States Patent
Ye

(10) Patent No.: US 7,012,413 B1
(45) Date of Patent: Mar. 14, 2006

(54) CONTROLLER FOR A POWER FACTOR CORRECTOR AND METHOD OF REGULATING THE POWER FACTOR CORRECTOR

(75) Inventor: Zhong Ye, Rowlett, TX (US)

(73) Assignee: Tyco Electronics Power Systems, Inc., Mesquite, TX (US)

( * ) Notice: Subject to any disclaimer, the term of this patent is extended or adjusted under 35 U.S.C. 154(b) by 173 days.

(21) Appl. No.: 10/632,409

(22) Filed: Aug. 1, 2003

(51) Int. Cl.
  *G05F 1/40* (2006.01)
  *H02M 1/12* (2006.01)

(52) U.S. Cl. ................ 323/284; 323/222; 323/285; 323/299; 363/45

(58) Field of Classification Search .................. 363/41, 363/45; 323/284, 285, 290, 299, 301, 351, 323/222
See application file for complete search history.

(56) References Cited

U.S. PATENT DOCUMENTS

| | | | |
|---|---|---|---|
| 5,001,620 A | 3/1991 | Smith | |
| 5,459,392 A | 10/1995 | Mandelcorn | |
| 5,793,623 A | * | 8/1998 | Kawashima et al. .......... 363/45 |
| 6,034,513 A | 3/2000 | Farrington et al. | |
| 6,091,233 A | 7/2000 | Hwang et al. | |
| 6,344,986 B1 | 2/2002 | Jain et al. | |

OTHER PUBLICATIONS

UCC2817, UCC2818, UCC3817, UC3838 BiCMOS Power Factor Preregulator; Unitrode Products from Texas Instruments; 2001; 18 pg, (no month).
L4981A, L4981B Power Factor Corrector; ST Microelectronics; Nov. 2001; 16 pg.

* cited by examiner

*Primary Examiner*—Jessica Han

(57) ABSTRACT

A controller for use with a current-controlled frequency-modulated power factor corrector having a power switch therein, and a method of regulating the same. In one embodiment, the controller includes a sensing circuit configured to detect a sense current that is representative of an input current to the power factor corrector. The controller also includes a frequency modulation circuit, coupled to the sensing circuit, configured to provide a signal that causes at least one of: (a) an increase of a switching frequency of the power switch when the input current increases, and (b) a decrease of the switching frequency of the power switch when the input current decreases.

20 Claims, 3 Drawing Sheets

CONTROLLER FOR A POWER FACTOR CORRECTOR AND METHOD OF REGULATING THE POWER FACTOR CORRECTOR

TECHNICAL FIELD OF THE INVENTION

The present invention is directed, in general, to power electronics and, more specifically, to a controller for a power factor corrector and a method of regulating the same.

BACKGROUND OF THE INVENTION

A power converter is a power processing circuit that converts an input voltage or current source waveform into a specified output voltage or current waveform. A switched-mode power converter is a frequently employed power converter that converts an input voltage waveform into a specified output voltage waveform. A boost converter is one example of a switched-mode power converter that is typically employed in off-line applications wherein power factor correction at the input and a stable, regulated voltage at the output are desired.

A non-isolated boost converter may form a portion of a power factor corrector and generally includes a boost inductor and a power switch coupled to the boost inductor. The boost converter further includes a boost diode coupled to a node between the boost inductor and the power switch. The boost converter still further includes an output capacitor coupled across an output of the boost converter. The output capacitor is usually large to ensure a constant output voltage. A load is then connected in parallel across the output capacitor. The output voltage (measured at the load) of the boost converter is always greater than the input voltage.

The boost converter generally operates as follows. The power switch is closed (conducting) for a first interval (D interval). The boost diode is reverse-biased, isolating the output capacitor and, therefore, the load from the input of the boost converter. During this interval, the input voltage supplies energy to charge the boost inductor and the boost inductor current increases. Since the load is isolated from the input voltage, a stored charge in the output capacitor powers the load. Then, for a second interval (1-D interval), the power switch is opened (non-conducting). The boost inductor current decreases as energy from both the boost inductor and the input flows forward through the boost diode to charge the output capacitor and power the load. By varying a duty cycle of the power switch, the output voltage of the boost converter may be controlled.

As previously mentioned, the boost converter, when employed in a power factor corrector, generally provides adequate power factor correction. The power factor is defined as a ratio of the actual power delivered to the load to a product of the root mean square values of the voltage and current at the input of the power factor corrector. The conventional boost converter, however, cannot directly process the AC power available from the AC line. The power factor corrector, therefore, includes an input full wave rectifier bridge to rectify the AC voltage from the AC line. The rectified AC voltage may then be processed by the boost converter. The rectifier bridge is subject to dissipative losses, particularly at low AC line voltages (e.g., 85 to 100 VAC). Further, the rectifier bridge may contribute to electromagnetic interference noise generated by the power factor corrector.

Analogous to other types of power supplies, the power factor corrector is subject to further inefficiencies that impair its overall performance. More specifically, the power switch and boost diode may be subject to conduction losses that reduce the efficiency of the power factor corrector. Additionally, the power switch (e.g., field-effect transistor) is subject to switching losses that occur, in part, when a charge built up in a parasitic capacitance of the power switch is dissipated when the power switch is transitioned to a conducting state. Furthermore, the boost diode may also be subject to a reverse recovery phenomenon, when the power switch is conducting, that induces a substantial current spike through both the power switch and the boost diode. The losses associated with the power switch and the boost diode increase as the switching frequency of the power factor corrector increases. Therefore, the reverse recovery and switching losses associated with the boost diode and power switch will impair the overall efficiency of the power factor corrector.

In accordance therewith, the power factor corrector is subject to electromagnetic interference associated with a switching noise and a ripple current therein. The ripple current generally occurs when a volts-second across the boost inductor changes. The switching noise generally occurs when a current or voltage of the power factor corrector is switched leading to, for instance, the power switch transitioning to a conducting state. Thus, in the environment of the boost converter topology, as the power switch transitions between conducting and nonconducting states, the power factor corrector suffers from a ripple current and switching noise. Relatively speaking, the switching noise may contribute more severely to the electromagnetic interference than the ripple current condition. Therefore, the higher the switching frequency, the higher the potential for the deleterious effects associated with the electromagnetic interference and the power losses, which will also impair the overall efficiency of the power factor corrector.

Accordingly, what is needed in the art is a controller for a power factor corrector and a method of regulating the power factor corrector that addresses and resolves the deleterious conditions that detract from an operation thereof.

SUMMARY OF THE INVENTION

To address the above-discussed deficiencies of the prior art, the present invention provides a controller for use with a current-controlled frequency-modulated power factor corrector having a power switch therein. In one embodiment, the controller includes a sensing circuit configured to detect a sense current that is representative of an input current to the power factor corrector. The controller also includes a frequency modulation circuit, coupled to the sensing circuit, configured to provide a signal that causes at least one of: (a) an increase of a switching frequency of the power switch when the input current increases, and (b) a decrease of the switching frequency of the power switch when the input current decreases.

In another aspect, the present invention provides a method of regulating a current-controlled frequency-modulated power factor corrector having a power switch. In one embodiment, the method includes detecting a sense current that is representative of an input current to the power factor corrector. The method also includes providing a signal that causes at least one of: (a) an increase of a switching frequency of the power switch when the input current increases, and (b) a decrease of the switching frequency of the power switch when the input current decreases.

In yet another aspect, the present invention provides a current-controlled frequency-modulated power factor corrector having an input that receives an input current at an input voltage and provides an output voltage at an output thereof. In one embodiment, the power factor corrector includes an electromagnetic interference filter (coupled to the input) that receives the input current, and a rectifier (coupled to the electromagnetic interference filter) that provides a rectified value of the input current and the input voltage. The power factor corrector also includes a converter, coupled to the rectifier, that includes a power switch. The power factor corrector still further includes a controller that regulates the output voltage and modulates a switching frequency of the power switch.

The controller includes a sensing circuit that detects a sense current that is representative of the input current to the power factor corrector. The controller also includes a frequency modulation circuit, coupled to the sensing circuit, that provides a signal that causes at least one of: (a) an increase of the switching frequency of the power switch when the input current increases, and (b) a decrease of the switching frequency of the power switch when the input current decreases. The controller still further includes a pulse width modulation control circuit, coupled to the sensing circuit and the frequency modulation circuit, that supplies a drive signal to the power switch. A frequency of the drive signal is modulated as a function of, in part, the sense current and the signal from the frequency modulation circuit.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
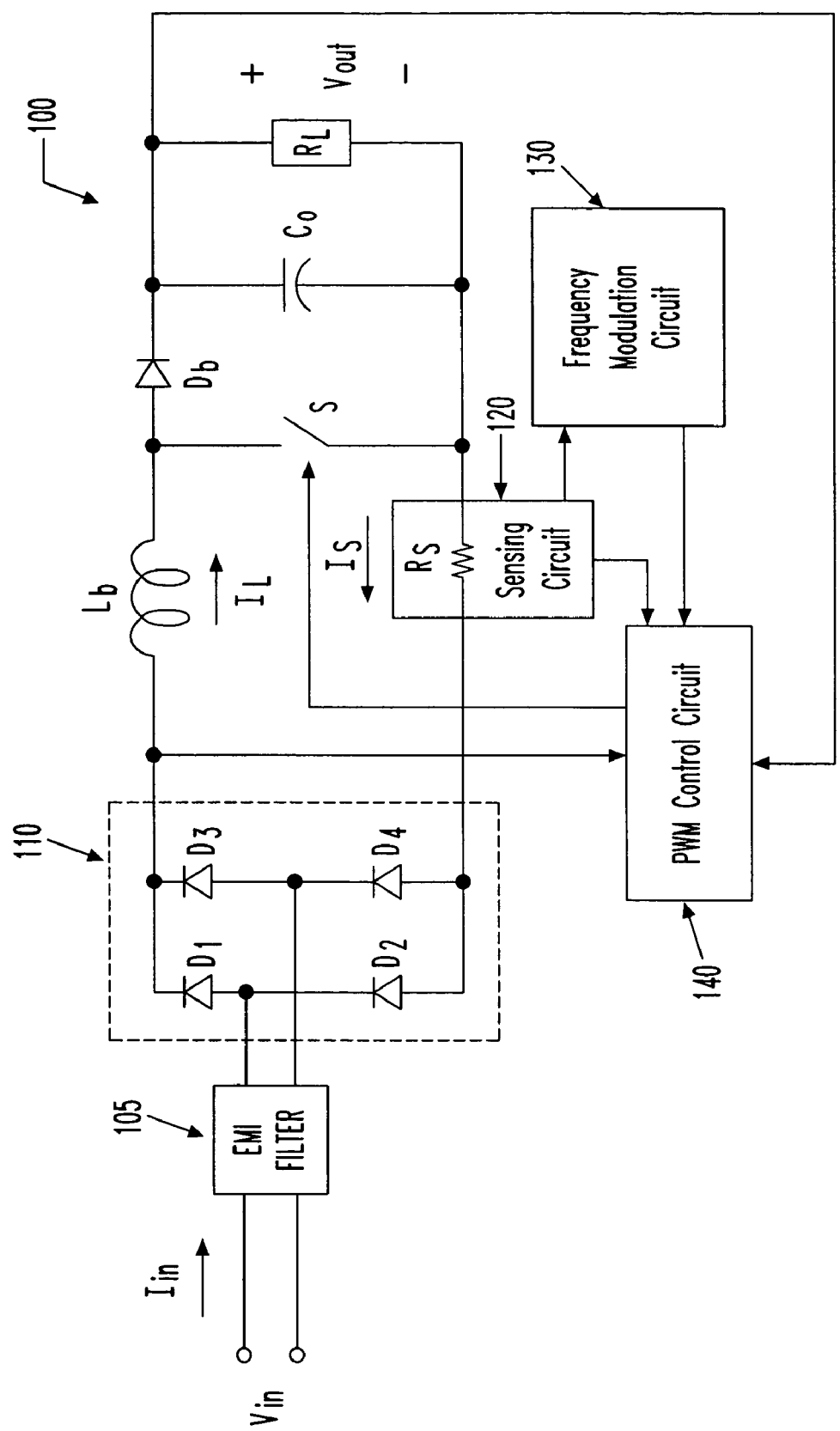
FIG. 1 illustrates a schematic diagram of an embodiment of a current-controlled frequency-modulated power factor corrector constructed according to the principles of the present invention.

Referring initially to FIG. 1, illustrated is a schematic diagram of an embodiment of a current-controlled frequency-modulated power factor corrector (also referred to as a power factor corrector) 100 constructed according to the principles of the present invention. The power factor corrector 100 has an input couplable to an AC source (not shown) having an input voltage $V_{in}$ and supplying an input current $I_{in}$. The power factor corrector 100 provides an output voltage $V_{out}$ at an output thereof. The power factor corrector 100 includes an electromagnetic interference (also referred to as "EMI") filter 105 and a rectifier 110 having first, second, third and fourth diodes $D_1$, $D_2$, $D_3$, $D_4$.

The power factor corrector 100 employs a boost converter topology having a boost inductor $L_b$ (with a boost inductor current $I_L$ passing therethrough), a power switch S, a boost diode $D_b$ and an output capacitor $C_o$. A characteristic of the boost converter topology is that the output voltage $V_{out}$ is greater than a rectified input voltage $V_{in}$. Of course, other topologies may be employed in the environment of the power factor corrector 100 and are well within the broad scope of the present invention. The power factor corrector 100 still further includes a controller and supplies the output voltage $V_{out}$ to a load $R_L$.

The EMI filter 105 reduces the electromagnetic interference generated by a ripple current component of the input current $I_{in}$ and boost inductor current $I_L$, and switching noise associated with switching devices (e.g., the power switch S) of the power factor corrector 100 to meet appropriate industry and agency standards. The rectifier 110, arranged in a full-bridge topology, provides a DC voltage to the boost inductor $L_b$. When the power switch S conducts for a first interval (D interval), the boost diode $D_b$ is reverse-biased, isolating the output capacitor $C_o$ and, therefore, the load $R_L$ from the input of the power factor corrector 100. During this interval, the input voltage $V_{in}$ supplies energy to charge the boost inductor $L_b$ and the boost inductor current $I_L$ increases. Since the load $R_L$ is isolated from the input voltage $V_{in}$, a stored charge in the output capacitor $C_o$ powers the load $R_L$.

Then, for a second interval (1-D interval), the power switch S is not conducting. The boost inductor current $I_L$ decreases as energy from both the boost inductor $L_b$ and the input flows forward through the boost diode $D_b$ to charge the output capacitor $C_o$ and power the load $R_L$. By varying a duty cycle of the power switch S, the output voltage $V_{out}$ of the power factor corrector 100 may be controlled and the input current $I_{in}$ may be better shaped to substantially match the input voltage $V_{in}$ to attain power factor correction.

The controller includes a sensing circuit 120, frequency modulation circuit 130 and a pulse width modulation (PWM) control circuit 140. The sensing circuit 120 senses a current (e.g., the input current $I_{in}$ or a current representative thereof) associated with the power factor corrector 100 and provides a signal to the frequency modulation circuit 130. In the illustrated embodiment, the sensing circuit 120 detects a sense current $I_s$ passing through a sense resistor $R_s$, which is representative of or analogous to the boost inductor current $I_L$ passing through the boost inductor $L_b$ and the input current $I_{in}$ of the power factor corrector 100. Of course, other sensing circuits 120 including a Hall effect current sense device are well within the broad scope of the present invention. The controller regulates the power factor corrector 100 including a frequency thereof as a function of the sense current $I_s$ thereby classifying the system as a current-controlled frequency-modulated power factor corrector 100.

An advantage of current-controlled frequency-modulated systems is that the switching frequency may be properly modulated according to the input current $I_{in}$ notwithstanding the input voltage $V_{in}$ thereto. This is generally possible since the inductance value of the boost inductor $L_b$ is current-dependent as opposed to voltage-dependent. In other words, a current-controlled frequency-modulated power factor corrector 100 may be better suited to take advantage of certain characteristics of the boost inductor $L_b$ to improve the energy conversion efficiency and reduce the electromagnetic interference associated with the power factor corrector 100.

Based upon the signal from the sensing circuit 120, the frequency modulation circuit 130 is adapted to vary a switching frequency of a drive signal from the PWM control circuit 140 to the power switch S. As mentioned above, the controller (via the PWM control circuit 140) provides a drive signal (i.e., a pulse width modulated drive signal in the illustrated embodiment) to vary a duty cycle of the power switch S to regulate the output voltage $V_{out}$ of the power factor corrector 100. The PWM control circuit 140 also provides the drive signal to maintain the input current $I_{in}$ proportional to the input voltage $V_{in}$ to obtain substantially unity ("1") power factor. In addition, the controller may vary the switching frequency of the power factor corrector 100 as a function of the sense current $I_s$ provided to the frequency modulation circuit 130.

Conventional power factor correctors employing a fixed switching frequency provide a narrow bandwidth of noise spectrum thereby intensifying the noise over an allocated bandwidth. Under such conditions, it is more difficult to limit the noise (i.e., switching noise) and maintain the electromagnetic interference within industry and agency standards. By employing frequency modulation, the power factor corrector 100 provides an advantage of varying the switching frequency to, under certain conditions, spread the electromagnetic interference over a wider spectrum. As a result, the electromagnetic interference may be reduced without having to increase the size of the EMI filter 105. For further support and understanding associated with frequency-modulated power factor correctors, see, for instance, U.S. Pat. No. 5,459,392, entitled Unity Power Factor Power Supply which includes an Electromagnetic Interference Reduction Circuit, issued Oct. 17, 1995, to Mandelcorn, which is incorporated by reference.

In the illustrated embodiment, the controller via the frequency modulation circuit 130 varies the switching frequency based upon the following parameters. The inductance value of the boost inductor $L_b$ (and generally most power inductors) substantially declines when a DC component of the boost inductor current $I_L$ increases. Thus, to reduce a current ripple associated with the boost inductor $L_b$, the power factor corrector 100 should preferably be operated at a higher switching frequency when the input current $I_{in}$ reaches some level.

Conversely, the switching frequency should be reduced when the input current $I_{in}$ is at a lower value. Inasmuch as the inductance value of the boost inductor $L_b$ increases as the boost inductor current $I_L$ decreases, a reduction in the switching frequency should limit the ripple current or maintain the ripple current in check and, at the same time, maintain the electromagnetic interference within industry and agency standards.

The reduction in the switching frequency further reduces the switching noise during a given period of time thereby decreasing the switching losses associated with the power switch S and boost diode $D_b$. As a result, the overall efficiency of the power factor corrector 100 increases and the electromagnetic interference associated therewith decreases. As stated above, the sensing circuit 120 detects a sense current $I_s$ across the sense resistor $R_s$, which is proportional to the input current $I_{in}$ and boost inductor current $I_L$, thereby providing the current parameters of the power factor corrector 100 to the frequency modulation circuit 130 to perform the frequency modulation as herein described.

Figure 2:
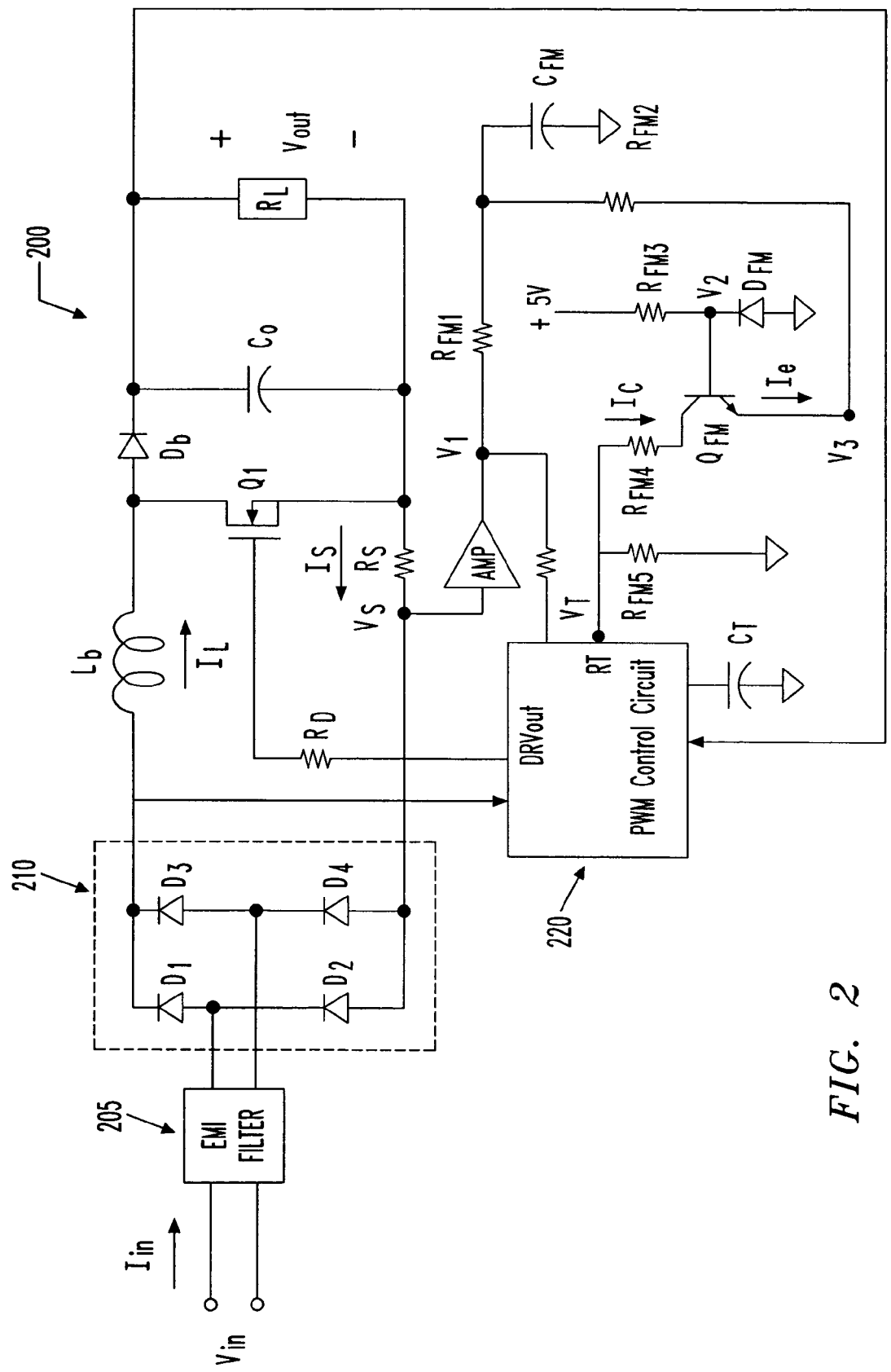
FIG. 2 illustrates a schematic diagram of another embodiment of a current-controlled frequency-modulated power factor corrector constructed according to the principles of the present invention.

Turning now to FIG. 2, illustrated is a schematic diagram of another embodiment of a current-controlled frequency-modulated power factor corrector (also referred to as a power factor corrector) 200 constructed according to the principles of the present invention. The power factor corrector 200 has an input couplable to an AC source (not shown) having an input voltage $V_{in}$ and supplying an input current $I_{in}$. The power factor corrector 200 provides an output voltage $V_{out}$ at an output thereof.

The power factor corrector 200 includes an EMI filter 205 and a rectifier 210 having first, second, third and fourth diodes $D_1$, $D_2$, $D_3$, $D_4$. The power factor corrector 200 employs a boost converter topology having a boost inductor $L_b$ (with a boost inductor current $I_L$ passing therethrough), a power switch (e.g., a field-effect transistor) $Q_1$, a boost diode $D_b$ and an output capacitor $C_o$. A characteristic of the boost converter topology is that the output voltage $V_{out}$ is greater than a rectified input voltage $V_{in}$. The power factor corrector 200 still further includes a controller and supplies the output voltage $V_{out}$ to a load $R_L$.

The controller includes a sensing circuit, frequency modulation circuit and a PWM control circuit 120. The sensing circuit includes an amplifier AMP. In the illustrated embodiment, the sensing circuit detects a sense current $I_s$ passing through a sense resistor $R_s$, which is representative of or analogous to the boost inductor current $I_L$ passing through the boost inductor $L_b$ and the input current $I_{in}$ of the power factor corrector 200. The controller regulates the power factor corrector 200 as a function of the sense current $I_s$ thereby classifying the system as a current-controlled frequency-modulated power factor corrector 200.

The frequency modulation circuit includes first, second, third, fourth and fifth frequency modulation resistors $R_{FM1}$, $R_{FM2}$, $R_{FM3}$, $R_{FM4}$, $R_{FM5}$, a frequency modulation capacitor $C_{FM}$, a frequency modulation diode $D_{FM}$ and a current-controlled device (e.g. a bipolar transistor) $Q_{FM}$. Based upon the signal from the sensing circuit, the frequency modulation circuit is adapted to vary a switching frequency of a drive signal from the PWM control circuit 220 to the power switch $Q_1$. The PWM control circuit may be embodied in a controller such as a UCC3818 integrated control circuit provided by Texas Instruments of Dallas, Tex. A programming resistor $R_T$ formed, in part, by a combination of the fourth and fifth frequency modulation resistors $R_{FM4}$, $R_{FM5}$ and a programming capacitor $C_T$ cooperate to allow the PWM control circuit 220 to modulate the switching frequency of the power factor corrector 200.

As mentioned above, the controller (via the PWM control circuit 220) provides a drive signal (i.e., a pulse width modulated drive signal in the illustrated embodiment) to vary a duty cycle of the power switch $Q_1$ to regulate the output voltage $V_{out}$ of the power factor corrector 200 and to shape the input current $I_{in}$ to substantially match the input voltage $V_{in}$ to attain power factor correction. The PWM control circuit 220 also provides the drive signal to maintain the input current $I_{in}$ proportional to the input voltage $V_{in}$ to obtain substantially unity ("1") power factor. In addition, the controller may vary the switching frequency of the power factor corrector 200 as a function of the sense current $I_s$ provided to the frequency modulation circuit.

The relationships that govern the operation of illustrated embodiment of the controller and the power factor corrector 200 will hereinafter be described. The output frequency of the PWM control circuit 220 may be represented as follows:

$$f = K_f / (C_T \times R_T),$$

wherein $K_f$ is a constant that reflects the characteristics of the PWM control circuit 220 (e.g., $K_f$ equals 0.6 for the UCC3818 integrated control circuit). Additionally, a value of the programming capacitor $C_T$ is typically constant and the value of the programming resistor $R_T$ is represented by:

$$R_T(R_{FM4EQUIV} \times R_{FM5})/(R_{FM4EQUIV} + R_{FM5}).$$

Thus, the value of the programming resistor $R_T$ is a function of the fifth frequency modulation resistors $R_{FM5}$ and a value of an equivalent resistance $R_{FM4EQUIV}$ in parallel with the fifth frequency modulation resistor $R_{FM5}$. Additionally, the value of the fifth frequency modulation resistor $R_{FM5}$ is typically constant whereas a value associated with the fourth frequency modulation resistor $R_{FM4}$ is variable.

The minimum frequency of the PWM control circuit 220 may be represented by:

$$f_{min} = K_f/(C_T \times R_{FM5}),$$

wherein the value of the fourth frequency modulation resistor $R_{FM4}$ is infinite. The maximum frequency of the PWM control circuit 220 when the current-controlled device $Q_{FM}$ is fully conducting may be represented by:

$$f_{max} = K_f/\{C_T \times [(R_{FM4} \times R_{FM5})/(R_{FM4} + R_{FM5})]\}.$$

Due to reasons that will become more apparent, for the majority of the operating range of the PWM control circuit 220, the equivalent resistance $R_{FM4EQUIV}$ in parallel with the fifth frequency modulation resistor $R_{FM5}$ of the programming resistor $R_T$ includes the fourth frequency modulation resistor $R_{FM4}$ and other components of the frequency modulation circuit.

Returning to the sensing circuit, a sense voltage $V_s$ associated with the sense resistor $R_s$ may be represented by:

$$V_s = -R_s \times I_s = -R_s \times I_L,$$

wherein the sense current $I_s$ is representative of or analogous to the boost inductor current $I_L$ passing through the boost inductor $L_b$ and the input current $I_{in}$ of the power factor corrector 200. The voltage at a node designated $V_1$ may be represented by:

$$V_1 = n \times V_s = n(R_s \times I_L),$$

wherein "n" is the gain of the amplifier AMP. The combination of the first frequency modulation resistor $R_{FM1}$ and the frequency modulation capacitor $C_{FM}$ form a filter (e.g., a low pass filter) to remove any ripple components associated with the voltage at the node designated $V_1$.

Inasmuch as the voltage at a node designated $V_2$ is about 0.7 volts (representing a voltage drop across the frequency modulation diode $D_{FM}$) and the resultant drop across the base and emitter of the current-controlled device $Q_{FM}$ is about 0.7 volts, it may be assumed that the voltage at a node designated $V_3$ is about 0 volts. Thus, the emitter current $I_e$ may be represented by:

$$I_e = V_1/(R_{FM1} + R_{FM2}) = n(R_s \times I_L)/(R_{FM1} + R_{FM2}).$$

The voltage at pin $R_T$ (designated voltage $V_T$) of the PWM control circuit 220 is normally fixed. Assuming that the collector current $I_c$ and emitter current $I_e$ of the current-controlled device $Q_{FM}$ are equal, then the equivalent resistance $R_{FM4EQUIV}$ in parallel with the fifth frequency modulation resistor $R_{FM5}$ of the programming resistor $R_T$ may be represented by:

$$R_{FM4EQUIV} = V_T/I_c = V_T(R_{FM1} + R_{FM2})/n(R_s \times I_L).$$

The relationship between the boost inductor current $I_L$ (which is the rectified input current $I_{in}$) and the frequency of the PWM control circuit 220 (and ultimately of the power factor corrector 200) may be represented by:

$$f_{PWM} = K_f[n(R_{FM5})(R_s)(I_L) + V_T(R_{FM1} + R_{FM2})]/C_T[(V_T) (R_{FM5})(R_{FM1} + R_{FM2})].$$

Thus, the frequency of the PWM control circuit 220 and ultimately the power factor corrector 200 may vary between the minimum and maximum switching frequency as set forth below:

$$f_{min} \leq f_{PWM} \leq f_{max}.$$

Relating the maximum switching frequency to the level of the boost inductor current $I_L$ (which is the rectified input current $I_{in}$) yields the following relationship:

$$I_L, f_{max} = V_T(R_{FM1} + R_{FM2})/n(R_{FM4} \times R_s)$$

wherein $I_L, f_{max}$ represents the value of the boost inductor current $I_L$ at the maximum switching frequency of the power factor corrector 200.

Thus, the controller varies the switching frequency between a maximum and minimum value as a function of the input current $I_{in}$ of the power factor corrector 200. More specifically, as the input current $I_{in}$ increases, the boost inductor current $I_L$ and sense current $I_s$ also increase. As a result, the absolute value of the sense voltage $V_s$ and the voltage at the node designated $V_1$ are higher in value. Additionally, due to the arrangement of the current-controlled device $Q_{FM}$ and accompanying components of the frequency modulation circuit, the emitter and collector currents $I_e$, $I_c$ of the current-controlled device $Q_{FM}$ also increase.

Since the voltage $V_T$ at pin RT of the PWM control circuit 220 is constant, the increase in collector current $I_c$ causes the equivalent resistance $R_{FM4EQUIV}$ of the programming resistor $R_T$ to decline thereby causing the PWM control circuit 220 to increase the frequency of the drive signal to the power switch $Q_1$. The PWM control circuit 220 will not allow the switching frequency to rise above the maximum frequency as set forth above (i.e., when the boost inductor current $I_L$ rises to the upper boost inductor current value $I_L, f_{max}$). Of course, the opposite operation occurs when the input current $I_{in}$ decreases. It should be understood that while the sensing circuit, frequency modulation circuit and the PWM control circuit 220 are represented as separate systems in the illustrated embodiment, it is well within the broad scope of the present invention to integrate portions or all of the respective sections into an integrated circuit depending on the particular application.

Figure 3:
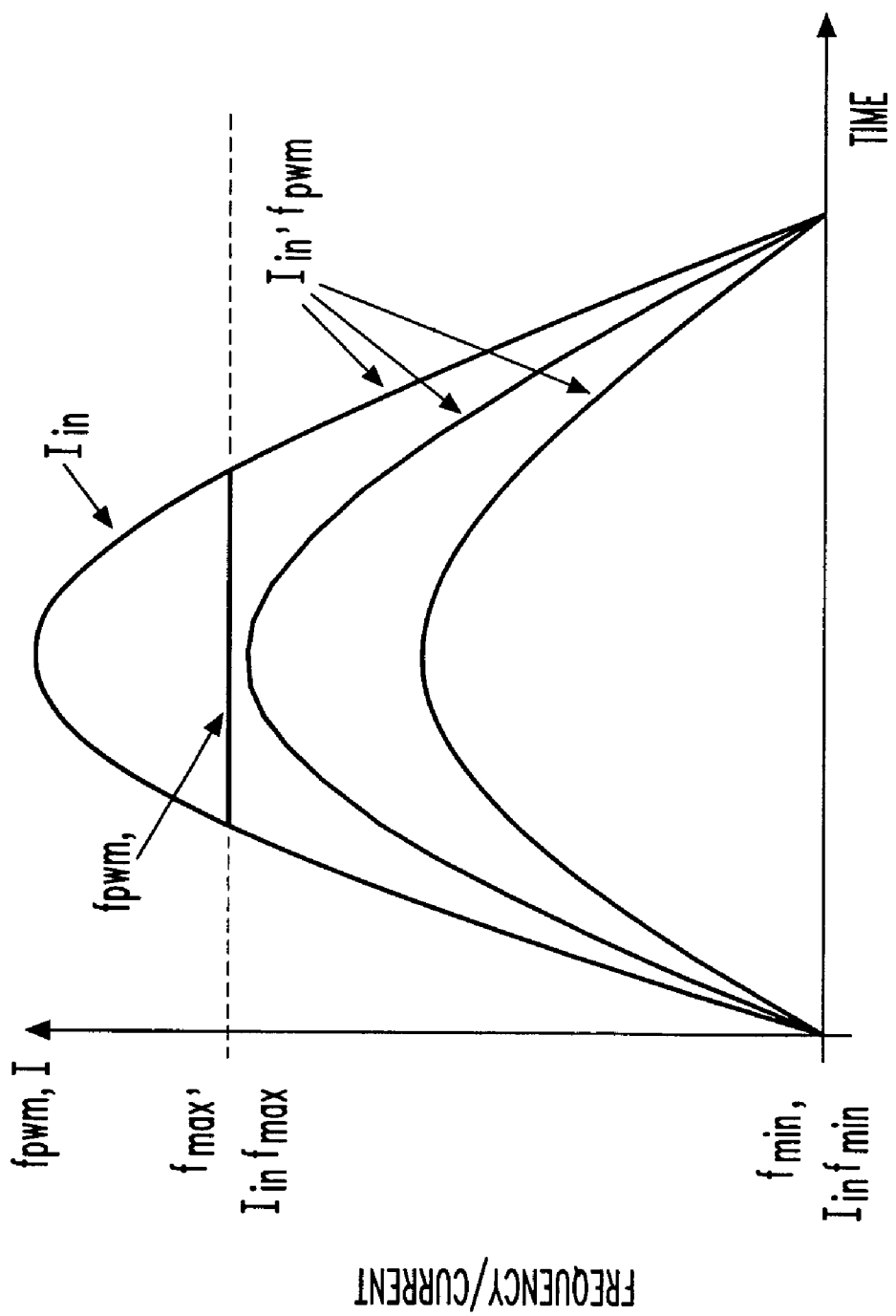
FIG. 3 illustrates a waveform diagram demonstrating exemplary advantages associated with the principles of the present invention.

Turning now to FIG. 3, illustrated is a waveform diagram demonstrating exemplary advantages associated with the principles of the present invention. More specifically, the waveform illustrates the frequency modulation of a current-controlled frequency-modulated power factor corrector (also referred to as a power factor corrector) as a function of current and time over half an AC cycle period.

As depicted on the vertical scale, a value of the switching frequency varies between a minimum frequency $f_{min}$ and a maximum frequency $f_{max}$. As the input current $I_{in}$ of the power factor corrector increases, the switching frequency increases to the maximum frequency $f_{max}$ corresponding to a current level represented by $I_{in}, f_{max}$. Even if the input current $I_{in}$ rises above the current level $I_{in}, f_{max}$ corresponding to the maximum frequency $f_{max}$ the switching frequency of the power factor corrector is limited to the maximum frequency $f_{max}$.

As the input current $I_{in}$ decreases, the switching frequency is reduced (down to a minimum frequency $f_{min}$ corresponding to a current level represented by $I_{in}, f_{min}$) as a function of time thereby limiting the ripple current or maintaining the ripple current in check and, at the same time, maintaining the electromagnetic interference within industry and agency standards. The reduction in the switching frequency further reduces the switching noise during a given period of time thereby decreasing the switching losses associated with the power factor corrector. As a result, the overall efficiency of the power factor corrector increases and the electromagnetic interference associated therewith decreases.

Thus, a controller for use with a current-controlled frequency-modulated power factor corrector has been introduced with readily attainable and quantifiable advantages. Those skilled in the art should understand that the previously described embodiments of the controller, method of operation thereof and current-controlled frequency-modulated power factor corrector are submitted for illustrative purposes only and that other embodiments capable of mitigating the adverse effects of electromagnetic interference, ripple currents and switching noise are well within the broad scope of the present invention.

Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa. The principles of the present invention may be applied to a wide variety of power circuit topologies including topologies that employ complementary power switches as a part of a power train thereof. For a better understanding of a variety of power supply topologies, see *Modern DC-to-DC Switchmode Power Converter Circuits*, by Rudolph P. Severns and Gordon Bloom, Van Nostrand Reinhold Company, New York, N.Y. (1985) and *Principles of Power Electronics*, by J. G. Kassakian, M. F. Schlecht and G. C. Verghese, Addison-Wesley (1991), which are both incorporated herein by reference in their entirety.

Although the present invention has been described in detail, those skilled in the art should understand that they can make various changes, substitutions and alterations herein without departing from the spirit and scope of the invention in its broadest form.

What is claimed is:

1. A current-controlled frequency-modulated power factor corrector having an input that receives an input current at an input voltage and providing an output voltage at an output thereof, comprising:
   an electromagnetic interference (EMI) filter, coupled to said input, that receives said input current;
   a rectifier, coupled to said EMI filter, that provides a rectified value of said input current and said input voltage;
   a converter, coupled to said rectifier, that includes a power switch; and
   a controller that regulates said output voltage and modulates a switching frequency of said power switch, comprising:
   a sensing circuit that detects a sense current representative of said input current to said power factor corrector,
   a frequency modulation circuit, coupled to said sensing circuit, that provides a signal that causes at least one of:
   an increase of said switching frequency of said power switch when said input current increases, and
   a decrease of said switching frequency of said power switch when said input current decreases, and
   a pulse width modulation control circuit, coupled to said sensing circuit and said frequency modulation circuit, that supplies a drive signal to said power switch, a frequency of said drive signal being modulated as a function of said sense current and said signal from said frequency modulation circuit.

2. The power factor corrector as recited in claim 1 wherein said frequency modulation circuit causes an increase of said switching frequency of said power switch up to a maximum frequency.

3. The power factor corrector as recited in claim 1 herein said frequency modulation circuit causes a decrease of said switching frequency of said power switch down to a minimum frequency.

4. The power factor corrector as recited in claim 1 wherein said sensing circuit detects said sense current passing through a sense resistor of said converter and comprises an amplifier.

5. The power factor corrector as recited in claim 1 wherein said frequency modulation circuit comprises a filter, a plurality of resistors, a diode and a current-controlled device.

6. The power factor corrector as recited in claim 1 wherein said converter employs a boost converter topology.

7. A controller for use with a current-controlled frequency-modulated power factor corrector having a power switch therein, comprising:
   a sensing circuit configured to detect a sense current representative of an input current to said power factor corrector; and
   a frequency modulation circuit, coupled to said sensing circuit, configured to provide a signal that causes at least one of:
   an increase of a switching frequency of said power switch when said input current increases, and
   a decrease of said switching frequency of said power switch when said input current decreases.

8. The controller as recited in claim 7 wherein said frequency modulation circuit is configured to cause an increase of said switching frequency of said power switch up to a maximum frequency.

9. The controller as recited in claim 7 wherein said frequency modulation circuit is configured to cause a decrease of said switching frequency of said power switch down to a minimum frequency.

10. The controller as recited in claim 7 further comprising a pulse width modulation control circuit, coupled to said frequency modulation circuit, configured to supply a drive signal to said power switch, a frequency of said drive signal being modulated as a function of said signal from said frequency modulation circuit.

11. The controller as recited in claim 7 wherein said sensing circuit is configured to detect said sense current passing through a sense resistor associated with said power factor corrector.

12. The controller as recited in claim 7 wherein said sensing circuit comprises an amplifier.

13. The controller as recited in claim 7 wherein said frequency modulation circuit comprises a filter, a plurality of resistors, a diode and a current-controlled device.

14. A method of regulating a current-controlled frequency-modulated power factor corrector having a power switch, comprising:

detecting a sense current representative of an input current to said power factor corrector; and providing a signal that causes at least one of:
an increase of a switching frequency of said power switch when said input current increases, and
a decrease of said switching frequency of said power switch when said input current decreases.

15. The method as recited in claim 14 wherein said providing causes an increase of said switching frequency of said power switch up to a maximum frequency.

16. The method as recited in claim 14 wherein said providing causes a decrease of said switching frequency of said power switch down to a minimum frequency.

17. The method as recited in claim 14 further comprising supplying a drive signal to said power switch, a frequency of said drive signal being modulated as a function of said signal according to said act of providing.

18. The method as recited in claim 14 wherein said detecting detects said sense current passing through a sense resistor associated with said power factor corrector.

19. The method as recited in claim 14 wherein said detecting is performed by a sensing circuit including an amplifier.

20. The method as recited in claim 14 wherein said providing is performed by a frequency modulation circuit comprising a filter, a plurality of resistors, a diode and a current-controlled device.

* * * * *